Irvin Cohen
Bernard D. Levy
INVENTORS

United States Patent Office 3,160,054
Patented Dec. 8, 1964

3,160,054
SURFACE SEALING FASTENER ASSEMBLY
Irvin Cohen, Reading, and Bernard D. Levy, Pittsburgh, Pa., assignors to Construction Fasteners, Inc., Reading, Pa., a corporation of Pennsylvania
Filed Mar. 20, 1962, Ser. No. 181,120
1 Claim. (Cl. 85—1)

This invention relates to a fastener assembly adapted to facilitate fastening of structural parts with a uniform pressure and more particularly to a weather sealing fastener assembly for corrugated types of panels.

In construction involving corrugated types of panels, a large number of fastener assemblies are required both to secure the panels together and prevent deterioration due to weather conditions at the overlapped portions of the panels. The fastener assemblies utilized must accordingly maintain the overlapped portions of the panels in contact with a uniformally applied pressure and also weather seal the apertures formed in the overlapping panel portions by the fastener assembly itself. Furthermore, in accomplishing the aforementioned objectives, installation of the fastener assembly should be possible in a rapid manner and with a minimum number of inexpensive parts. It is therefore a primary object of this invention to provide such a fastener assembly.

In acordance with the foregoing objects, the fastener assembly of the present invention facilitates installation thereof by requiring no accurate pre-assembly by the installer in order to obtain uniform pressure engagement with the exposed surfaces of the overlapping panel portions or for that matter with the exposed surface of any parts being secured by the fastener assembly.

A further object of this invention in accordance with the foregoing objects, is to provide a fastener assembly capable of applying uniform sealing pressure to the exposed surface through which the fastener assembly extends regardless of the flatness or curvature of the surface.

An additional object of this invention in accordance with the foregoing objects, is to provide a fastener assembly that will provide a uniform sealing pressure about the aperture formed by the fastener assembly without requiring the exercise of skill or caution on the part of the installer. A large savings in time and labor is thereby achieved.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 3:
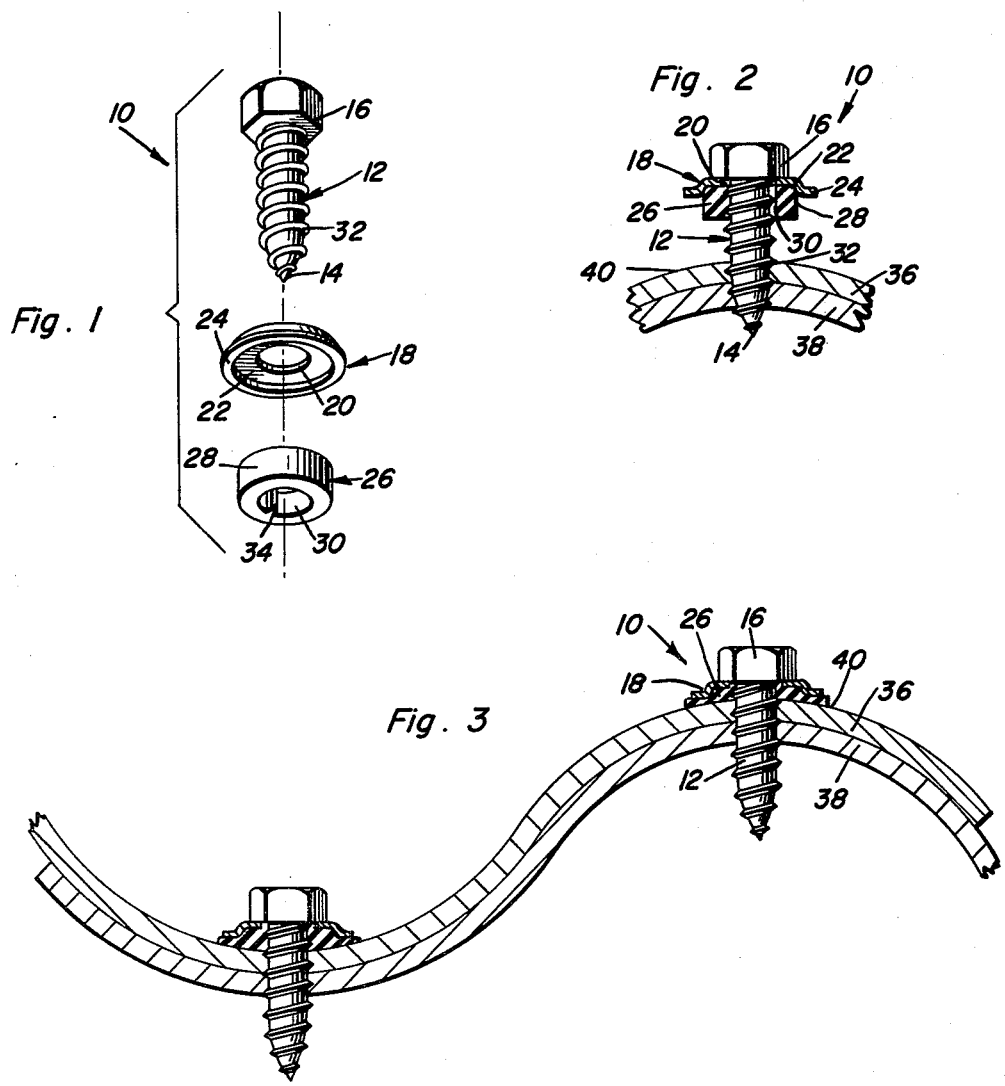
FIGURE 1 is a perspective view of the disassembled parts of the fastener assembly.
FIGURE 2 is a sectional view of the fastener assembly in assembled condition prior to completion of installation thereof.
FIGURE 3 is a sectional view of two fastener assemblies installed at two different locations.

Referring now to the drawings in detail, it will be observed from FIGURE 1, that the fastener assembly generally referred to by reference numeral 10 includes a screw member or threaded shank portion 12 which may be of any suitable form as for example one having self-tapping threads to form threaded apertures in the parts to be secured together. Connected to one axial end of the screw member 12, opposite the point 14, is the head member 16 through which rotative force is applied to the screw member by a tool. The head 16 as illustrated in the present example, is hexagonal. A rigid retainer member generally referred to by reference numeral 18 also forms part of the fastener assembly. The rigid retainer or backing member includes therefore a central opening 20 in a central dome within which an annular recess 22 is formed extending in an axial direction from the peripheral flange or annular rim portion 24 of the disk member forming the retainer 18. The annular recess 22 is provided on the underside of the dome of the retainer 18 with an annular seating surface about opening 20 adapted to seat a sealing washer member 26 forming the final part of the fastener assembly. The washer member 26 is therefore made of flexible material such as neoprene rubber and is considerably wider in an axial direction than the retainer 18. The outer diameter of the external surface 28 of the washer 26 is dimensioned so that the washer may be received by the annular recess 22 within in the retainer 18. The inner diameter of the internal surface 30 of the washer is also dimensioned so as to loosely receive therethrough the screw member 12 without interference with the threads 32 thereof. However, the internal surface 30 is provided with a projection 34 that extends radially inwardly thereof for frictional engagement with the threads 32 of the screw member 12.

Referring now to FIGURE 2 in particular, it will be observed that the central opening 20 in the retainer 18 loosely receives therethrough the screw member 12. However, in order to maintain the retainer 18 in assembled relation against the head 16 and also coaxial with the screw member 12, the washer member 26 is held spaced from the threads 32 of the screw member by means of a radially inward spacing projection 34 establishing frictional engagement therewith at one location. The projection 34 as shown in FIGURES 1 and 2, extends axially the length of the member 26 and projects radially from its internal surface 30 along a restricted circumferential portion. Accordingly, the fastener assembly may be assembled just prior to installation maintained in a coaxially aligned condition so that it may be installed in a proper manner. The exercise of care on the part of the installer to ordinarily so position and hold the parts during installation is therefore avoided. The fastener assembly so assembled, may then be installed by threading through a pair of parts 36 and 38 that overlap each other. Although the fastener assembly may be utilized in connection with flat surfaces, the assembly 10 of the present invention is also well suited for the fastening of parts having an exposed surface 40 that is curved.

Referring now to FIGURE 3, it will be observed that after rotative torque has been applied to the screw member 12 by means of the head 16 engaging the bearing face on top of the dome of the retainer 18 to exert axial thrust thereon, the washer member 26 will have expanded in a radial direction under the compressive force applied between the head 16 and the exposed surface 40. As a result of the seating of the washer member 26 within the recess 22 of the retainer 18, it will under all circumstances be maintained in coaxial relation to the screw member so that the axial compressive force applied thereto will uniformly expand the material of the washer in a radial direction. The radial expansion of the material will however occur in proportion to the compressive forces applied thereto so that a uniformly distributed pressure will result. Also, it will be observed that the axial extent of the washer member 26 exceeds that of the retainer 18 by an amount so that when finally installed, the material of the washer will extend entirely beneath the retainer 18 avoiding contact of the retainer with the exposed surface 40 to thereby achieve complete sealing of the exposed surface 40 with respect to the threaded apertures formed therein by the screw member 12. Depending upon the curvature of the exposed surface 40, the material of the washer will expand by different amounts to fill the space between the retainer member 18 and the exposed surface in order to obtain uniform distribution of pressure thereagainst. This latter attribute of the fastener assembly 10 will be apparent by comparing its installation at both locations in FIGURE 3 wherein the curvature of the exposed surface 40 reverses.

From the foregoing description, the advantages and utility of the novel fastener assembly of the present invention will be apparent. It will therefore be appreciated, that by virtue of the novel shape of the rigid retainer member 18 cooperating with the washer 26 maintaining all of the assembly parts in coaxial relation prior to installation of the assembly, and during installation restricting the washer to its coaxial relation to the screw, a superior weather sealing fastening may be made in a more rapid manner and through the exercise of less skill. Also, by virtue of the novel fastener assembly, the aforementioned advantageous sealing attributes of the assembly will be available regardless of the flatness or curvature of the exposed surface through which the assembly is installed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination with a fastener having a head and a shank threadedly received in a member, a sealing assembly comprising; a rigid retainer having a centering recess portion and a peripheral rim portion, said recess portion having a flat bearing surface engageable by the head and a flat seating surface through which an opening extends of a diameter larger than that of the shank, said rim portion being axially spaced from the seating surface, a separate cylindrical sealing member made of resilient material having an external surface with a constant outside diameter substantially equal to that of the seating surface and an internal surface with an inside diameter larger than the diameter of the shank, said sealing member when seated on the seating surface extending axially beyond the rim portion before deformation by an amount sufficient to expand radially outward beyond the rim portion and radially inward into engagement with the shank, and a single projection formed on the sealing member and extending axially along the internal surface, said projection being formed along a restricted circumferential portion of the internal surface and extending radially inward into frictional contact with the shank at one location for holding the sealing member coaxially assembled on the shank when seated on the seating surface of the rigid retainer to also axially align the bearing surface with the head before torque is applied thereto.

References Cited in the file of this patent

UNITED STATES PATENTS

| | | |
|---|---|---|
| 1,636,135 | Hughes | July 19, 1927 |
| 2,632,479 | Pfeil et al. | Mar. 24, 1953 |
| 2,761,347 | McKee | Sept. 4, 1956 |
| 2,927,495 | Barwood | Mar. 8, 1960 |
| 3,062,557 | Underwood | Nov. 6, 1962 |

FOREIGN PATENTS

| | | |
|---|---|---|
| 673,953 | Great Britain | June 18, 1952 |

OTHER REFERENCES

"Parker-Kalon Staps," 4-page leaflet published by Parker-Kalon of New Jersey, February 1958.